United States Patent
Bergfeld et al.

(10) Patent No.: US 9,551,997 B2
(45) Date of Patent: Jan. 24, 2017

(54) ELECTROMAGNETIC FLUID VALVE

(71) Applicant: Kendrion (Villingen) GmbH, Villingen-Schwenningen (DE)

(72) Inventors: Bjoern Bergfeld, Balingen-Endingen (DE); Holger Brandenburg, Villingen-Schwenningen (DE); Martin Ohnmacht, Fluorn-Winzeln (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 145 days.

(21) Appl. No.: 14/161,965

(22) Filed: Jan. 23, 2014

(65) Prior Publication Data

US 2014/0202561 A1 Jul. 24, 2014

(30) Foreign Application Priority Data

Jan. 24, 2013 (DE) .................. 10 2013 100 717

(51) Int. Cl.
*F16K 31/06* (2006.01)
*F16K 47/00* (2006.01)
(Continued)

(52) U.S. Cl.
CPC .............. *G05D 7/0635* (2013.01); *F16F 9/34* (2013.01); *F16F 9/466* (2013.01);
(Continued)

(58) Field of Classification Search
CPC .............. F16F 9/34; F16F 9/342; F16F 9/466; F16K 3/26; F16K 3/265; F16K 31/0648; F16K 31/0668; G05D 7/0635
(Continued)

(56) References Cited

U.S. PATENT DOCUMENTS 2,543,455 A    2/1951  Goepfrich
2,661,182 A *  12/1953 Kipp ................... F16K 3/26
                                                 137/625.68
(Continued)

FOREIGN PATENT DOCUMENTS

CH    DE 4125238 A1 *  2/1993  ........... G05D 7/0126

OTHER PUBLICATIONS

International Search report from corresponding European application No. 13199700.9 dated May 15, 2014.

*Primary Examiner* — Marina Tietjen
*Assistant Examiner* — Seth W Mackay-Smith
(74) *Attorney, Agent, or Firm* — Jonathan A. Kidney; TechLaw LLP

(57) ABSTRACT

Electromagnetic fluid valve regulating the throughflow of a pressure medium which flows through a housing part having at least two inlet openings which lie opposite one another and at least one outlet opening for the pressure medium. It being possible for a channel which is situated between the inlet openings and the outlet opening to be closed to a greater or lesser extent by an axially movable slide for regulating the throughflow of the pressure medium, a pin protruding into the channel centrically with respect to the center axis of the fluid valve, the pin being provided, for flow guidance, with an outer contour which is of at least approximately conical, pyramidal or hyperbolic design, with the result that the pressure medium which is to flow from the inlet openings strikes the outer contour of the pin and diverted in the direction of the at least one outlet opening.

16 Claims, 1 Drawing Sheet

(51) Int. Cl.
*F16L 55/02* (2006.01)
*G05D 7/06* (2006.01)
*F16F 9/46* (2006.01)
*F16F 9/34* (2006.01)

(52) U.S. Cl.
CPC ...... *F16K 31/0648* (2013.01); *F16K 31/0668* (2013.01); *Y10T 137/7761* (2015.04)

(58) Field of Classification Search
USPC .............................. 251/118, 129.07, 129.15
See application file for complete search history.

(56) References Cited

U.S. PATENT DOCUMENTS

| | | | |
|---|---|---|---|
| 4,339,109 A | 7/1982 | Kawata | |
| 4,361,309 A * | 11/1982 | Sogabe | F16K 31/0679 |
| | | | 251/129.08 |
| 4,425,767 A * | 1/1984 | Barbier | F25B 41/04 |
| | | | 137/513.5 |
| 4,579,145 A * | 4/1986 | Leiber | F16H 61/0251 |
| | | | 137/312 |
| 4,635,683 A * | 1/1987 | Nielsen | H01F 7/13 |
| | | | 137/625.65 |
| 5,516,076 A | 5/1996 | Stobbs | |
| 6,968,816 B2 * | 11/2005 | Isobe | F01L 1/022 |
| | | | 123/90.12 |
| 7,976,419 B2 * | 7/2011 | Hartinger | G05D 7/0635 |
| | | | 165/271 |
| 8,740,185 B2 * | 6/2014 | Guggenmos | B60T 8/363 |
| | | | 251/129.15 |
| 9,022,346 B2 * | 5/2015 | Najmolhoda | F16K 31/06 |
| | | | 137/625.65 |
| 2006/0065870 A1 | 3/2006 | Mori | |

* cited by examiner

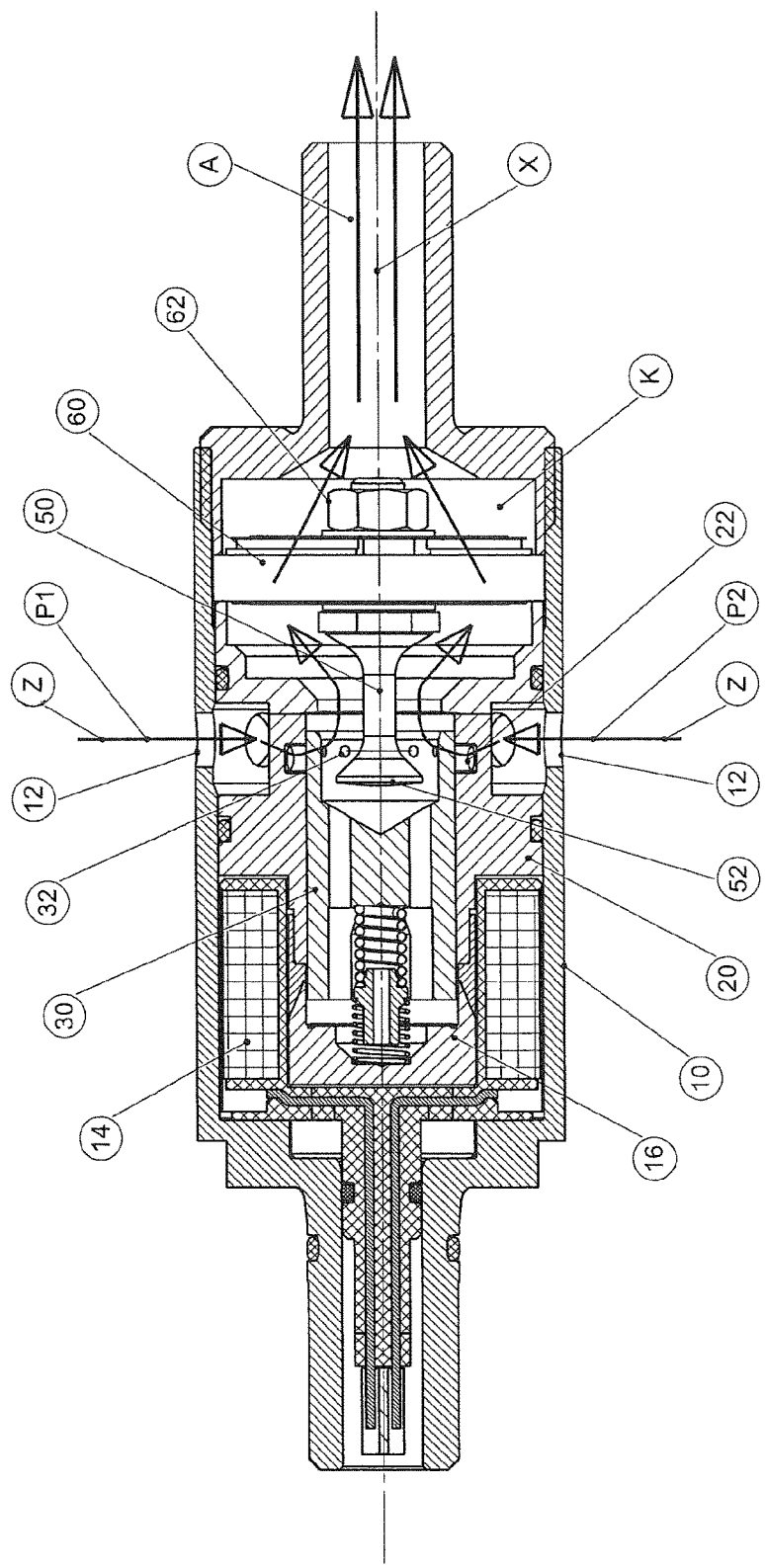

ELECTROMAGNETIC FLUID VALVE

CROSS-REFERENCE TO RELATED APPLICATION(S)

This application claims the benefit of German Patent Application 10 2013 100 717.1 filed Jan. 24, 2013, the contents of which are hereby incorporated by reference in its entirety.

FIELD

The invention relates to an electromagnetic fluid valve, in particular proportional valve for regulating the throughflow of pressure medium which flows through a housing part.

BACKGROUND

Damper systems which can be adjusted actively for vehicles are known, which damper systems as a rule operate according to the principle of a variable opening cross section. Dampers of this type set the corresponding shock absorber characteristic values via hydraulic proportional valves and can be adapted to different driving situations, for example with regard to the roadway surface or to different client requests. With the aid of a movable slide which is moved by a magnet coil, the proportional valves continuously control the throughflow of fluid in the damper. Depending on the application of current to the electromagnetic proportional valve, the cross section thereof through which oil flows is changed. This brings about a change in the pressure loss which should have a declining profile as the throughflow increases. For this purpose, the resulting flow forces on the valve slide which changes the cross section have to be kept as small as possible in the opening direction, since otherwise the valve slide does not open sufficient cross section and, as a result, the pressure loss has an increasing profile as the volumetric flow rises.

A proportional valve which forms the generic type is known, for example, from DE 10 2007 005 466 A1, the valve slide of which proportional valve is connected directly to a magnet armature for the electromagnetic actuation of the valve. The cross section of a passage in the housing, which passage connects the valve inlet to a valve outlet, is changed continuously by way of a control edge which is provided on the valve slide. In this proportional valve, the valve slide is configured as an outer slide and is mounted and guided on a tubular slide guide which is fastened in the valve housing on the inlet side. Said valve slide is therefore mounted firstly via the magnet armature and secondly via said tubular slide guide. As a result of this double mounting of the valve slide, the involved components have to meet high manufacturing accuracies which likewise lead to high manufacturing costs.

In the known electromagnetic fluid valves, a multiplicity of radial inlet openings are frequently provided in the housing. The pressure medium is guided through said radial inlet openings into the interior of the housing of the electromagnetic fluid valve and is guided there via a channel to at least one outlet opening. Regulation of the throughflow of the pressure medium takes place via a suitable movable slide, by the movable slide closing the inlet openings to a greater or lesser extent and thus throttling the pressure medium in the channel.

It is problematical in the use of a multiplicity of radial inlet openings that the pressure medium in the interior of the housing of the electromagnetic fluid valve flows toward itself and this leads to eddying there. An unstable flow state of this type, that is to say a change from turbulent to laminar flow in valves, through which fluid flows, is problematical because fluctuating flow forces are produced as a result.

The invention has the aim of avoiding or at least reducing fluctuating flow forces of this type and of ensuring from the start that only a laminar flow of the pressure medium takes place into the housing of the electromagnetic fluid valve.

SUMMARY

This aim is achieved by an electromagnetic fluid valve having the features described below.

The invention is based substantially on inserting a pin with a special outer contour into the flow channel of the housing, by way of which pin the pressure medium which is fed through the inlet openings is diverted in a targeted manner in the direction of the outlet opening.

BRIEF DESCRIPTION OF THE FIGURE(S)

FIG. 1 is an illustration of an electromagnetic fluid valve.

DETAILED DESCRIPTION OF THE FIGURE(S)

The following single FIGURE shows one exemplary embodiment of an electromagnetic fluid valve of this type in a sectional illustration.

Since the basic construction of an electromagnetic fluid valve, in particular of an electromagnetic proportional valve, is readily clear to a person skilled in the art, merely those components which are essential in the present case for understanding the invention will be described in the following text.

As FIG. 1 shows, the electromagnetic fluid valve has an outer housing part 10 with a plurality of radial inlet openings 12. Here, the inlet of the pressure medium is denoted by Z. A further housing part 12 is seated in the interior of said housing part 10, which further housing part 12 likewise has inlet openings 22 which correspond with the abovementioned inlet openings 12 of the first housing part 10. A movable slide 30 is seated in the interior of said second housing part 20, via which movable slide 30 inlet openings 22 of the second housing part 20 can be closed to a greater or lesser extent. In the exemplary embodiment which is shown, the slide 30 which is configured as an inner slide has holes 32 for this purpose, which holes can be pushed axially past the inlet openings 22. Instead of the holes 32, it is readily possible that the slide 30 is of somewhat shorter design than in FIG. 1 and closes the inlet openings 22 to a greater or lesser extent with its front, end-side end.

The slide 30 is moved in a manner which is known per se via an electromagnet by way of current being applied to the coil 14. A pole core 16 is also provided for this purpose in the interior of the housing 10.

As FIG. 1 likewise shows, the electromagnetic fluid valve has an outlet A (shown on the right-hand side) for the pressure medium. A channel K is situated between the inlet openings 12, 22 and the outlet, through which channel K the pressure medium is guided.

In order that targeted flow guidance of the pressure medium from the inlets 12, 22 to the outlet A occurs, a pin 50 with a special outer contour is provided within the housing 10 centrically with respect to the center axis X. The pin 50 protrudes with its end side 52 which faces away from the outlet opening A beyond the abovementioned openings 12, 22 and the holes 32 completely and, on its end side 52, has at least approximately an external diameter which corresponds at least approximately to the internal diameter of the slide 30. The outer contour of the pin 50 is designed in the region of the holes 12, 22 in such a way that targeted diversion of the pressure medium from the inlets 12, 22 to the outlet A takes place. For this purpose, the outer contour is of at least approximately conical, pyramidal or hyperbolic design in the region of the openings 12, 22. As shown in the figure by the channel guide K, the pressure medium is therefore diverted in a targeted manner from the inlets 12, 22 to the right in the direction of the outlet opening A.

Eddying of the pressure medium is therefore avoided, as would occur, for example, without the provision of a pin 50 of this type. If the pin 50 were absent, the inlets 12, 22 which lie opposite one another would ensure that the pressure medium impacts with itself. Even if a pin 50 which has merely a cylindrical outer contour were provided, the pressure medium would impact with said pin in a manner which is opposed to the inlet direction. Targeted flow guidance of the pressure medium would therefore likewise not be possible by way of a pin with a cylindrical outer circumference.

In the exemplary embodiment which is shown, a damper element 60 is also situated in the right-hand part of the housing 10. The pin 50 is connected to said damper element 60 in a fixed manner, for example is screwed by means of a screw 62 in a fixed manner. As the figure shows, on the part which is shown to the left of the damper element 60, the pin is configured at least approximately in section as a double cone or as a single hyperboloid.

LIST OF REFERENCE NUMERALS

10 First housing par
12 Opening
14 Coil
16 Pole core
20 Second housing part
22 Openings
30 Slide
32 Hole
50 Pin
52 End side
60 Damper element
62 Screw
K Channel
A Outlet
Z Inlet
X Axis

The invention claimed is:

1. Electromagnetic fluid valve for regulating the throughflow of a pressure medium which flows through a housing part, comprising:
a housing part having at least two inlet openings which lie opposite one another and at least one outlet opening for the pressure medium, and it being possible for a channel which is situated between the inlet openings and the outlet opening to be closed to a greater or lesser extent by means of an axially movable slide for regulating the throughflow of the pressure medium, a pin separate from the slide mounted in a fixed manner inside the channel centrically with respect to the center axis of the fluid valve,
wherein the pin is provided, for flow guidance, and shaped with an outer contour which is one of at least approximately conical, pyramidal or hyperbolic design, with the result that the pressure medium which is to flow from the inlet openings strikes the outer contour of the pin and is diverted in the direction of the at least one outlet opening.

2. The electromagnetic fluid valve according to claim 1, wherein the pin has an outer contour in the form of a double cone or a single hyperboloid.

3. The electromagnetic fluid valve according to claim 2, wherein the pin is connected, or screwed, to a damper element in a fixed manner.

4. The electromagnetic fluid valve according to claim 2, wherein the slide is configured as an inner slide.

5. The electromagnetic fluid valve according to claim 2, wherein the pin protrudes axially completely beyond the inlet openings.

6. The electromagnetic fluid valve according to claim 5, wherein the end face of the pin which faces away from the outlet opening has a diameter which corresponds at least approximately to an internal diameter of the movable slide.

7. The electromagnetic fluid valve according to claim 1, wherein the pin is connected, or screwed, to a damper element in a fixed manner.

8. The electromagnetic fluid valve according to claim 7, wherein the slide is configured as an inner slide.

9. The electromagnetic fluid valve according to claim 7, wherein the pin protrudes axially completely beyond the inlet openings.

10. The electromagnetic fluid valve according to claim 9, wherein the end face of the pin which faces away from the outlet opening has a diameter which corresponds at least approximately to an internal diameter of the movable slide.

11. The electromagnetic fluid valve according to claim 1, wherein the slide is configured as an inner slide.

12. The electromagnetic fluid valve according to claim 11, wherein the pin protrudes axially completely beyond the inlet openings.

13. The electromagnetic fluid valve according to claim 12, wherein the end face of the pin which faces away from the outlet opening has a diameter which corresponds at least approximately to an internal diameter of the movable slide.

14. The electromagnetic fluid valve according to claim 1, wherein the pin protrudes axially completely beyond the inlet openings.

15. The electromagnetic fluid valve according to claim 14, wherein the end face of the pin which faces away from the outlet opening has a diameter which corresponds at least approximately to an internal diameter of the movable slide.

16. Electromagnetic fluid valve for regulating the throughflow of a pressure medium which flows through a housing part, comprising:
a housing part having at least two inlet openings which lie opposite one another and at least one outlet opening for the pressure medium, and it being possible for a channel which is situated between the inlet openings and the outlet opening to be closed to a greater or lesser extent by means of an axially movable slide for regulating the throughflow of the pressure medium, a pin separate from the slide mounted in a fixed manner inside the channel centrically with respect to a center axis of the fluid valve, the pin being connected, or screwed, to a damper element in a fixed manner,
wherein the pin is provided, for flow guidance, and shaped with an outer contour which is one of at least approximately conical, pyramidal or hyperbolic design, with the result that the pressure medium which is to flow from the inlet openings strikes the outer contour of the pin and is diverted in the direction of the at least one outlet opening.

* * * * *